United States Patent
Leglaye et al.

(10) Patent No.: US 9,413,141 B2
(45) Date of Patent: Aug. 9, 2016

(54) SPARK PLUG FOR COMBUSTION CHAMBER OF A GAS TURBINE ENGINE

(71) Applicant: SNECMA, Paris (FR)

(72) Inventors: Francois Leglaye, Vaux le Penil (FR); Jean-Francois Cabre, St. Pierre du Perray (FR); David Gino Stifanic, La Rochette (FR)

(73) Assignee: SNECMA, Paris (FR)

( * ) Notice: Subject to any disclaimer, the term of this patent is extended or adjusted under 35 U.S.C. 154(b) by 561 days.

(21) Appl. No.: 13/861,825

(22) Filed: Apr. 12, 2013

(65) Prior Publication Data
US 2013/0327013 A1    Dec. 12, 2013

(30) Foreign Application Priority Data
Apr. 26, 2012    (FR) ...................... 12 53873

(51) Int. Cl.
*F02C 7/266* (2006.01)
*H01T 13/16* (2006.01)
*H01T 13/20* (2006.01)

(52) U.S. Cl.
CPC ............... *H01T 13/16* (2013.01); *F02C 7/266* (2013.01); *H01T 13/20* (2013.01)

(58) Field of Classification Search
CPC ......... F02C 7/266; H01T 13/16; H01T 13/20; F02P 13/00; F02P 15/003
See application file for complete search history.

(56) References Cited

U.S. PATENT DOCUMENTS

| | | | | |
|---|---|---|---|---|
| 1,721,158 A | | 7/1929 | Leonard | |
| 2,493,743 A | * | 1/1950 | Benson | H01T 13/16 123/169 V |
| 2,625,921 A | | 1/1953 | Van Ry | |
| 2,693,082 A | * | 11/1954 | Arthur | E02F 5/104 123/169 R |
| 3,048,015 A | | 8/1962 | Barrelle et al. | |
| 3,878,418 A | * | 4/1975 | Meyer | H01T 13/54 313/118 |
| 5,264,754 A | * | 11/1993 | Hanitijo | H01T 13/32 313/139 |

(Continued)

FOREIGN PATENT DOCUMENTS

| | | |
|---|---|---|
| GB | 345779 | 4/1931 |
| GB | 469565 | 7/1937 |

(Continued)

OTHER PUBLICATIONS

French Preliminary Search Report issued Jan. 31, 2013, in Application No. FR 1253873 (FA 768645) (with Translation of Category of Cited Documents).

(Continued)

*Primary Examiner* — Arun Goyal
(74) *Attorney, Agent, or Firm* — Oblon, McClelland, Maier & Neustadt, L.L.P.

(57) ABSTRACT

A spark plug for combustion chamber of a gas turbine engine including: an external body forming ground electrode, intended to be received mainly in a bypass of the combustion chamber; an internal central electrode; and an interposed insulator with clearance between the external body and the internal electrode, is provided. The spark plug terminates in a nose forming portion to be received in the flame tube of the chamber of the combustion chamber, and a semi-conductor element being interposed between the central electrode and the ground electrode at the level of said nose forming portion. The external body includes at least one cooling air inlet which communicates inside the spark plug with at least one outlet arranged at the level of the nose forming portion.

10 Claims, 4 Drawing Sheets

(56) References Cited

U.S. PATENT DOCUMENTS

| | | | | |
|---|---|---|---|---|
| 6,215,234 B1 * | 4/2001 | Abe | ................ | H01T 13/20 123/169 EL |
| 8,796,909 B2 * | 8/2014 | Hasegawa | ............... | H01T 13/16 313/120 |

FOREIGN PATENT DOCUMENTS

| | | |
|---|---|---|
| GB | 587564 | 4/1947 |
| GB | 723726 | 2/1955 |
| GB | 827944 | 2/1960 |
| GB | 1 250 180 | 10/1971 |
| JP | 8-213148 | 8/1996 |

OTHER PUBLICATIONS

United Kingdom Search Report issued Oct. 25, 2013 in Patent Application No. GB1307422.4.

* cited by examiner

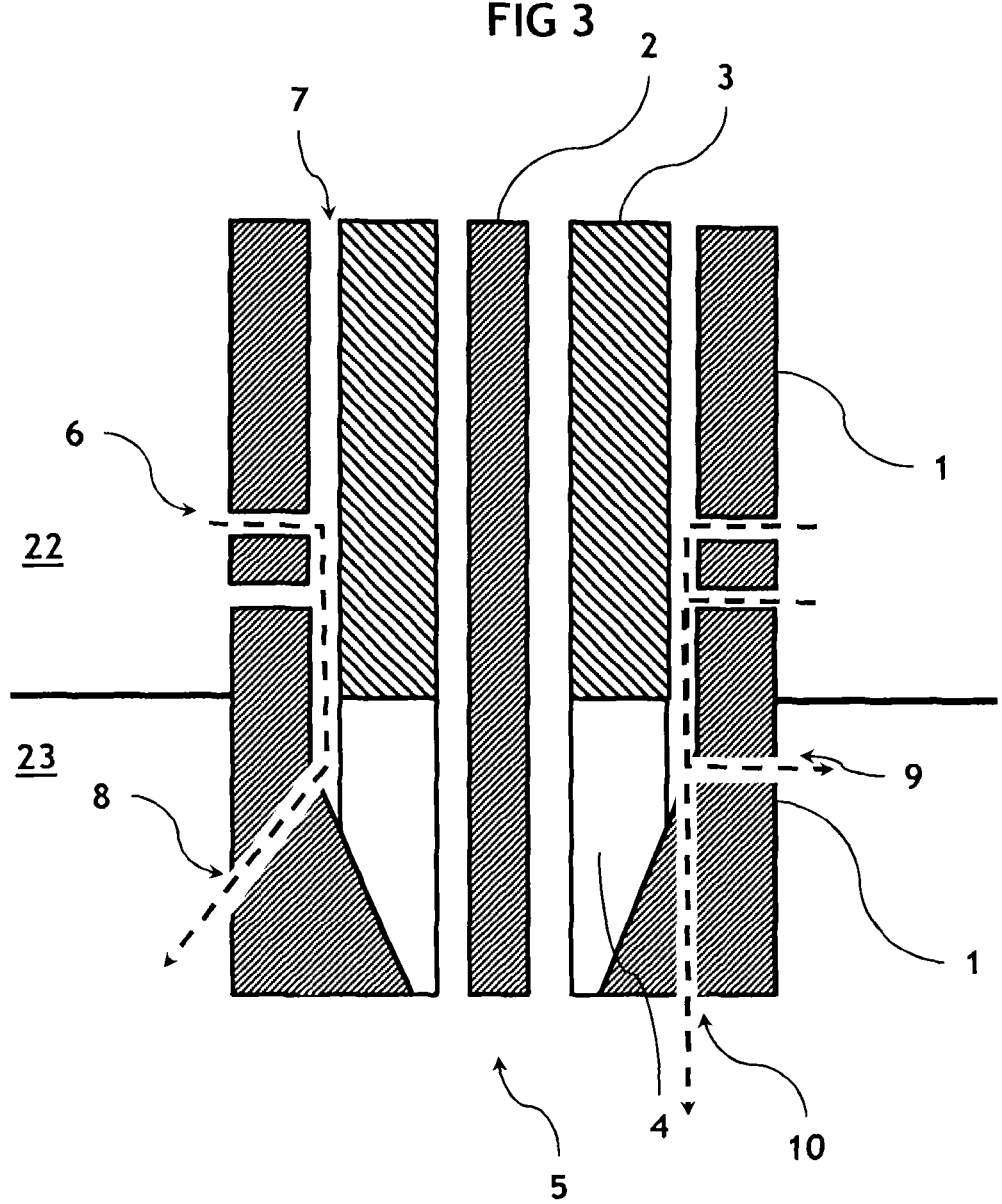

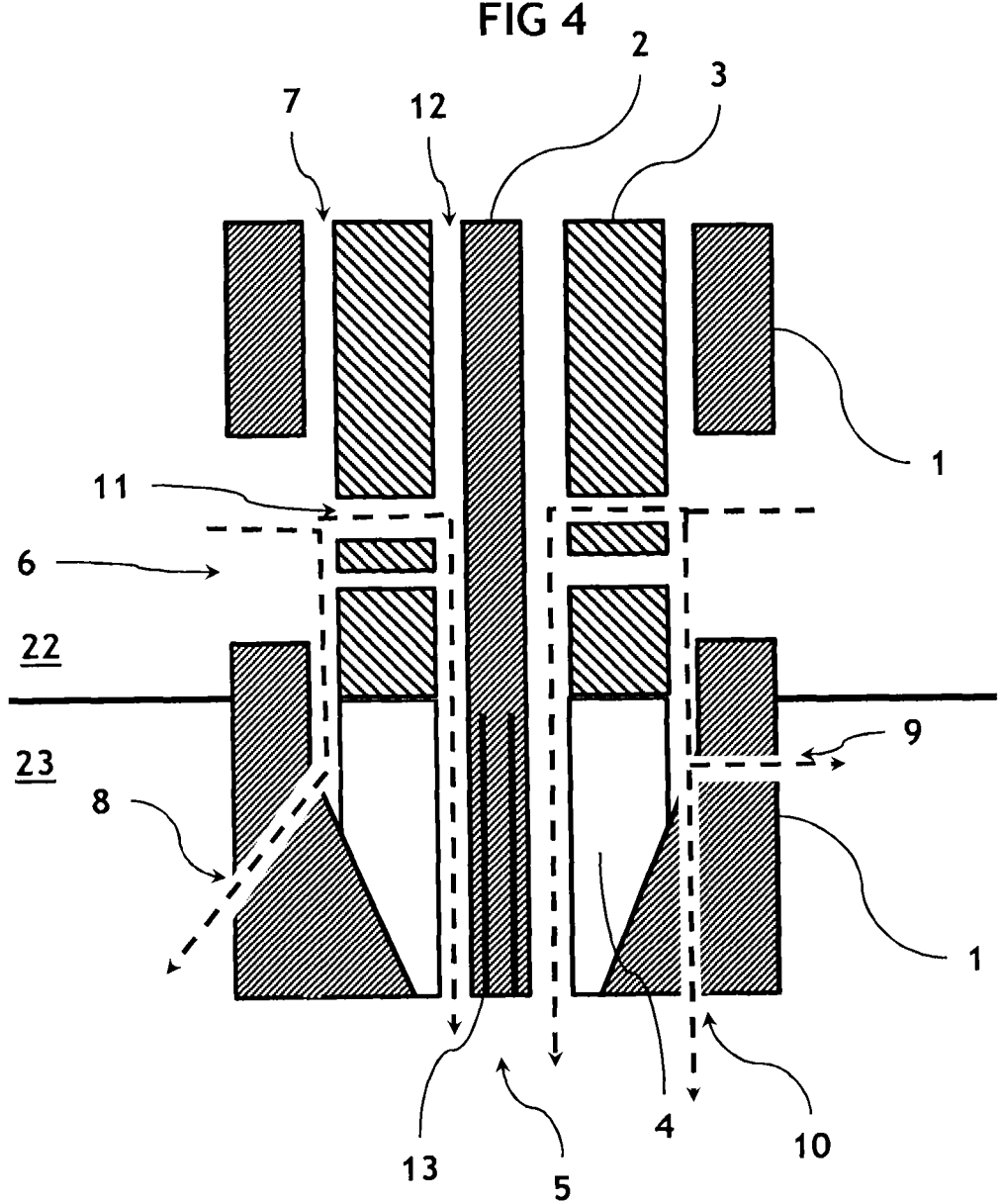

SPARK PLUG FOR COMBUSTION CHAMBER OF A GAS TURBINE ENGINE

GENERAL TECHNICAL FIELD AND CONTEXT OF THE INVENTION

The present invention relates to the field of gas turbine engines as well as a post-combustion system of aircraft engines, and more particularly relates to the cooling of a spark plug mounted at the level of a combustion chamber.

In a gas turbine engine, the combustion chamber receives the air from the compressor, a part of which is mixed with the fuel which is burned in the primary combustion zone. The ignition is assured by one or two spark plugs arranged downstream of the carburation system. Another part of the air bypasses the primary combustion zone and mixes with the combustion gases. All of the hot gases are directed towards the turbine.

Some aircrafts are moreover equipped with a post-combustion device. A post-combustion device comprises fuel injection means near to flame holder components and at least one spark plug. In post-combustion regime, additional fuel is injected to obtain a thrust increase.

FIG. 1 illustrates a schematic view of an example of low voltage spark plug with semi-conductor of the prior art.

Such a spark plug comprises an external body 1 forming an external electrode, or ground electrode, which takes for example the form of a tubular metal body extending over the external contours of the spark plug to constitute therefrom a sheath, and an internal or central electrode 2, taking the form of a metal shaft housed inside the external electrode 1. The external electrode 1 and the internal electrode 2 share the same axis of symmetry.

An insulator 3 assures the electrical insulation between the external electrode 1 and the internal electrode 2. A ceramic semi-conductor element 4 is arranged at the end of the spark plug (nose 5), between the external electrode 1 and the internal electrode 2. A potential difference applied between the external electrode 1 and the internal electrode 2, typically from 1 kV to 3 kV, leads to the appearance of a spark at the level of the nose 5 of the spark plug, to ignite the combustion chamber.

Spark plugs, whether for combustion or for post-combustion, are subject to numerous constraints which can limit the lifetime thereof. For example, the breakdown of the spark plug under high pressure or an exposure of the end of the spark plug to a fluid, particularly fuel or water, can reduce the lifetime thereof.

The exposure of the end of a spark plug to high temperatures, above 600° C., can significantly reduce the lifetime of a spark plug. A reduction in the lifetime of spark plugs leads to additional maintenance costs and reduces the availability of the aircraft as well as the reliability of the performances thereof.

It is thus desirable to be able to cool the spark plugs and thereby increase the lifetime thereof.

FIG. 2 illustrates an example of configuration in which a spark plug is cooled by circulation of air (arrow represented in FIG. 2). A flow of air 20 coming from a diffusor 21 circulates in an external bypass 22 of the combustion chamber 23, cools a spark plug 24 by impact of air passing via the spark plug guide 25 and by conduction over the upper portion of the spark plug 24 with the spark plug adaptor 26. The external bypass is separated from the flame tube 29 of the combustion chamber by an external casing 27, whereas an internal casing 28 is another wall of the combustion chamber 23.

Complementary layouts can be provided to further cool the spark plug, particularly by a circulation of bypass air at the level of the nose 5 of the spark plug. The patent application FR 2 926 329 discloses a layout in this sense.

However, a cooling of the exterior of the spark plug or of only the nose thereof can prove to be insufficient.

DESCRIPTION OF THE INVENTION

There generally exist clearances between the insulator and the electrodes, as well as between the central electrode and the semi-conductor.

The invention exploits said clearances and proposes a spark plug in which the structure enables an internal cooling by circulation of air inside internal spaces defined by said clearances.

It also profits from the pressure differential that exists between the bypass and the flame tube to create a cooling at the hottest end of the spark plug opposite the flame and to make cooling air circulate inside the spark plug.

Thus, the invention proposes a spark plug for combustion chamber of a gas turbine engine comprising:
  an external body forming ground electrode, intended to be received mainly in a bypass of the combustion chamber,
  an internal central electrode,
  an interposed insulator with clearance between the external body and the internal electrode, said spark plug terminating in a nose forming portion intended for its part to be received in the flame tube of the combustion chamber,
  a semiconductor element being interposed between the central electrode and the ground electrode at the level of said nose forming portion,
  wherein the external body comprises at least one cooling air inlet which communicates inside the spark plug with at least one outlet arranged at the level of the nose forming portion, and
  wherein the insulator also comprises at least one air inlet, the cooling air introduced between the insulator and the central electrode discharging at the level of the nose of the spark plug via the clearance between said central electrode and the semi-conductor element.

With such a structure of spark plug, the cooling air circulates inside the spark plug to be applied for example to the ground electrode and/or to the central electrode and/or to the insulator and/or to the semi-conductor.

Such a spark plug structure is also advantageously completed by the following different characteristics taken alone or according to the different possible combinations thereof:
  a cooling air inlet is a hole emerging into the space forming clearance between the external body and the insulator;
  the external body comprises a plurality of air inlet holes, said holes being perforations cut into the thickness of the external body;
  the external body also comprises at the level of the nose of the spark plug at least one outlet hole emerging into the space forming clearance between the external body and the semi-conductor element;
  the external body comprises a plurality of outlet holes, said outlet holes being perforations cut into the thickness thereof, perpendicular to the axis along which said external body extends, and/or extending in an inclined manner through the thickness of said external body and/or extending parallel to the axis along which said external body extends, emerging therefrom at the level of the nose of the spark plug;
  the central electrode comprises, at the end thereof at the level of the nose forming portion, at least one groove;

the air inlet at the level of the insulator comprises a plurality of inlet holes constituted of perforations cut into the thickness of the external body, preferably according to an angle comprised between 30 and 60°, in the direction of the nose of the spark plug, with respect to the axis along which said external body extends, the air inlet holes of the external body being of a diameter greater than that of the air inlet holes of the insulator and avoiding the creation of an electric arc;

the diameter of an inlet hole and/or an outlet hole is less than 1 mm.

The invention also relates to a turbine engine comprising such a spark plug.

DESCRIPTION OF DRAWINGS

Other characteristics, aims and advantages of the invention will become clear from the description that follows, which is purely illustrative and non-limiting, and which should be read with reference to the appended drawings, among which:

FIG. 3 is a schematic representation of the structure of an end of a spark plug according to a possible embodiment of the invention, FIG. 4 is a schematic representation of the structure of an end of a spark plug according to another possible embodiment of the invention.

DETAILED DESCRIPTION

Figure 1:
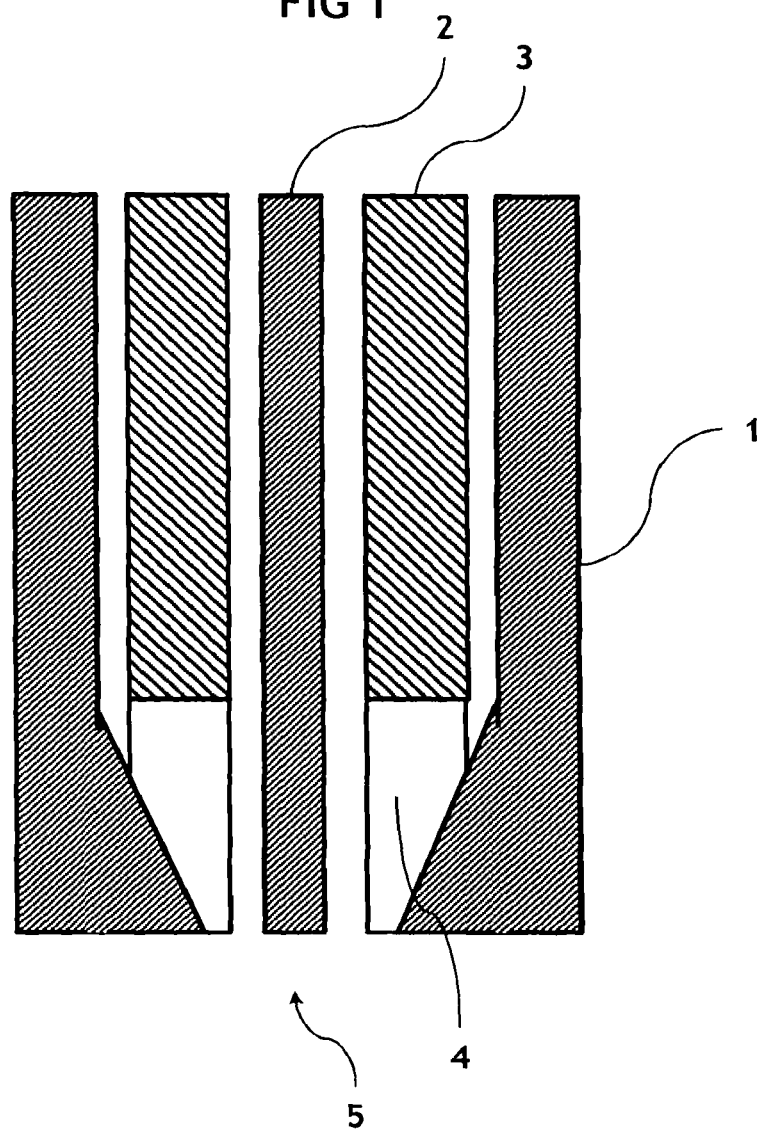
FIG. 1, already discussed, is a schematic representation of the structure of the end of a spark plug, FIG. 2, also already discussed, schematically illustrates the layout of a spark plug in a combustion chamber of a gas turbine engine.

The spark plug illustrated in FIG. 3 comprises an external electrode 1 forming ground electrode, a central electrode 2, as well as an insulator 3 interposed between the external electrode 1 and the central electrode 2 over the main part of the height of the spark plug. An element made of a semi-conductor material 4 is interposed, in the place of the insulator 3, at the level of the nose 5 of the spark plug.

The cylindrical body that constitutes the external body 1 has several holes that traverse the thickness of said body 1 and emerge into the space 7 forming clearance between said external body and the insulator 3.

The different holes 6 capture the cooling air and enable the entry of bypass air at the level of said clearance 7.

Outlet holes 8, 9, 10 are also provided at the level of the nose 5 of the spark plug. Said holes are also holes cut into the external body 1. They emerge at the level of the clearance 7 between the semi-conductor element 4 and the external body and thus make it possible to evacuate the heated air into the flame tube.

The diameters of the entry holes 6 and outlet holes 8, 9, 10 are for example sufficiently small to avoid the intrusion of pollutant or particles. Thus, in the case of a spark plug having an external electrode 1 of 8 to 12 mm diameter and of 1 to 3 mm thickness, they are formed by perforations of diameter less than 800 µm.

The inlet holes 6 are perforated through the external body 1, for example perpendicularly to the axis along which said external body 1 extends, in other words in relation to the axis of the spark plug, but preferably according to an angle comprised between 30 and 60° with respect to the axis along which said external body 1 extends, in the direction of the nose of the spark plug. Such an orientation makes it possible to facilitate the circulation of air.

In the case of the dimensioning indicated above, said inlet holes 6 are four in number. The number of outlet holes is similar to the number of inlet holes.

The outlet holes 8, 9, 10 can be of different geometries.

For example, they may also be perpendicular to the axis of the spark plug (case illustrated by the hole 9).

They may also be inclined with respect thereto and evacuate the air diagonally (case illustrated by the hole 8).

They may even be parallel to the axis of the spark plug and emerge near to the tip thereof (case illustrated by the hole 10).

It will be noted that in the different examples illustrated in FIG. 3, the insulator 3 maintains its integrity. The quality of the breakdown in the spark plug nose is not affected at the end by the evacuation of the cooling air since the vaporised kerosene is not deviated with respect to the spark plug nose.

Figure 2:
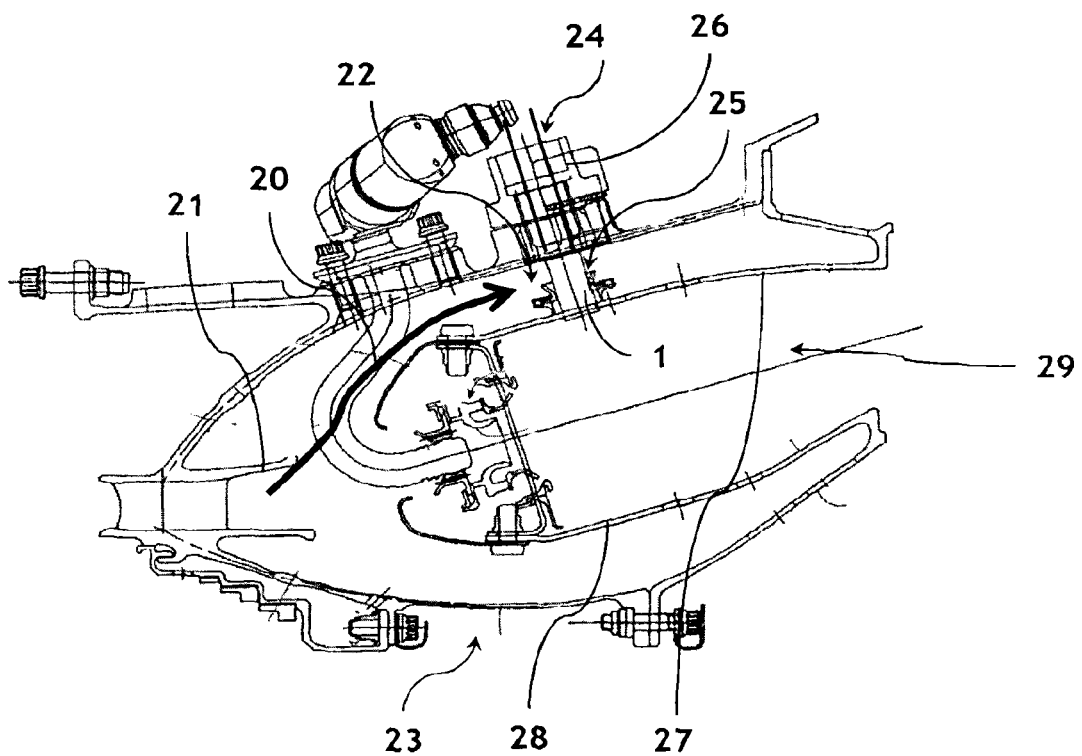

Such a spark plug is for example a low voltage spark plug used in a combustion chamber of a turbine engine, with a configuration of the type of that illustrated in FIG. 2, the cylindrical body 1 that defines the ground electrode of the spark plug being received mainly in a bypass 22 of the combustion chamber 23, the nose forming portion 5 of the spark plug being for its part received in the flame tube 29 of said chamber.

FIG. 4 illustrates for its part other possible embodiments on which holes 11 are also cut into the insulator 3, said holes 11 emerging into the space 12 forming clearance between the central electrode 2 and the insulator 3.

In this case, the evacuation of the cooling air between the insulator 3 and the central electrode 2 takes place via the clearance that said space 12 defines since it emerges at the level of the nose forming portion 5 of the spark plug, at the level of the end of the central electrode 2.

At least one groove 13 may be provided on said central electrode 2 in order to increase the section of passage to the flame tube of the combustion chamber. For example, the central electrode 2 may have an external diameter of 3 to 5 mm and terminate at the level of the nose of the spark plug by a shape with 4 to 12 grooves 13 which are for example V-section grooves of maximum depth of 0.1 to 0.2 mm, of 5 to 20 mm height and of 0.1 to 0.2 mm width at the base thereof.

In the example illustrated in this FIG. 4, the holes 11 cut into the insulator 3 are perpendicular to the axis along which said external body 1 extends, but, preferably, the holes 11 may have an angle comprised between 30 and 60° with respect to the axis along which said external body 1 extends, in the direction of the nose of the spark plug. Such an angulation makes it possible to facilitate the circulation of air.

In the example illustrated in this FIG. 4, the holes 6 cut at the level of the external body 1 are holes of greater diameter than the holes 11 cut into the insulator 3.

For example, for a ceramic insulator 3 of 2 to 5 mm thickness, the holes 6 cut into the external body 1 are of 4 to 10 mm diameter, whereas the holes 11 cut into the insulator 3 are of diameter less than 800 µm.

It will be noted in particular that such a dimensioning of the diameter of the external hole makes it possible to avoid the creation of an electric arc (the risk of which would exist otherwise since the insulator 3 is pierced).

Furthermore, the air between the insulator 3 and the ground electrode 1 is evacuated in the same way as in the case of the spark plug structure of FIG. 3 by the holes 8, 9, 10.

Here also, the air is evacuated at the level of the flame tube and the breakdown in the spark plug nose is not affected. The ejection of cooling air in the spark plug nose moreover contributes to the protection thereof by reducing the contact with the fuel in the liquid state. The circulation of air thereby realised enables a significant cooling of the critical zones of the nose of spark plug and a gain in lifetime and temperature resistance.

The invention claimed is:

1. A spark plug in a combustion chamber of a gas turbine engine comprising:
   an external body forming a ground electrode, received in a bypass of the combustion chamber, said external body having a thickness;
   an internal central electrode; and
   an interposed electrical insulator interposed between the external body and the internal central electrode with a first clearance between the interposed electrical insulator and the external body, and a second clearance between the interposed electrical insulator and the internal central electrode,
   said spark plug terminating in a nose forming portion received in a flame tube of the combustion chamber, a semi-conductor element being interposed between the internal central electrode and the ground electrode at a level of said nose forming portion, the external body comprising at least one cooling air inlet which communicates inside the spark plug with at least one outlet arranged at the level of the nose forming portion,
   wherein the interposed electrical insulator comprises at least one air inlet, the at least one air inlet emerging into a space forming the second clearance between the interposed electrical insulator and the internal central electrode, cooling air being introduced between the interposed electrical insulator and the internal central electrode in contact with the internal central electrode and discharging at the level of the nose forming portion of the spark plug via a clearance between said internal central electrode and the semi-conductor element.

2. The spark plug according to claim 1, wherein the at least one cooling air inlet is a hole emerging into a space forming the first clearance between the external body and the interposed electrical insulator.

3. The spark plug according to claim 2, wherein the external body comprises a plurality of the at least one cooling air inlet holes, said plurality of the at least one cooling air inlet holes being perforations cut into the thickness of the external body.

4. The spark plug according to claim 2, wherein the external body comprises at the level of the nose forming portion of the spark plug at least one outlet hole cut into the external body and emerging into a space forming a clearance between the external body and the semi-conductor element.

5. The spark plug according to claim 4, wherein said spark plug comprises a plurality of the at least one outlet holes, said plurality of the at least one outlet holes being perforations cut into the thickness of the external body, perpendicular to an axis along which said external body extends, and/or extending in an inclined manner through the thickness of said external body and/or extending parallel to the axis along which said external body extends, emerging therefrom at the level of the nose forming portion of the spark plug.

6. The spark plug according to claim 1, wherein the internal central electrode comprises, at an end thereof at the level of the nose forming portion, at least one groove in order to increase a section of a passage to the flame tube of the combustion chamber.

7. The spark plug according to claim 1, wherein the at least one air inlet at a level of the interposed electrical insulator comprises a plurality of air inlet holes constituted of perforations cut into interposed electrical insulator, according to an angle comprised between 30 and 60° with respect to an axis along which said external body extends, the at least one cooling air inlet of the external body being of a diameter greater than that of the plurality of air inlet holes of the interposed electrical insulator and avoiding the creation of an electric arc.

8. The spark plug according to claim 1, wherein a diameter of that least one cooling air inlet and the at least one outlet is less than 1 mm.

9. The spark plug according to claim 1, wherein the semi-conductor element extends from a free end of the interposed electrical insulator such that a distance of the clearance between said internal central electrode and the semi-conductor element is equal to a distance of the second clearance between the interposed electrical insulator and the internal central electrode.

10. A turbine engine with combustion chamber comprising a spark plug comprising:
    an external body forming a ground electrode, said external body having a thickness;
    an internal central electrode; and
    an interposed electrical insulator interposed between the external body and the internal central electrode with a first clearance between the interposed electrical insulator and the external body, and a second clearance between the interposed electrical insulator and the internal central electrode,
    said spark plug terminating in a nose forming portion, and a semi-conductor element is interposed between the internal central electrode and the ground electrode at a level of said nose forming portion,
    said spark plug being received in a bypass of the combustion chamber, the nose forming portion being received in a flame tube of the combustion chamber,
    the external body comprising at least one cooling air inlet which communicates inside the spark plug with at least one outlet arranged at the level of the nose forming portion,
    wherein the interposed electrical insulator comprises at least one air inlet, the at least one air inlet emerging into a space forming the second clearance between the interposed electrical insulator and the internal central electrode, cooling air being introduced between the interposed electrical insulator and the internal central electrode in contact with the internal central electrode and discharging at the level of the nose forming portion of the spark plug via the clearance between said internal central electrode and the semi-conductor element.

* * * * *